United States Patent
Libal et al.

(10) Patent No.: US 9,349,068 B2
(45) Date of Patent: May 24, 2016

(54) DETECTING CAMERA CONDITIONS TO INITIATE CAMERA MAINTENANCE

(71) Applicant: Honeywell International Inc., Morristown, NJ (US)

(72) Inventors: Vit Libal, Praha (CZ); Pavel Vacha, Prague (CZ); Axel Reichert, Brooklyn Park, MN (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/297,191

(22) Filed: Jun. 5, 2014

(65) Prior Publication Data

US 2015/0356371 A1    Dec. 10, 2015

(51) Int. Cl.

| | |
|---|---|
| H04N 5/225 | (2006.01) |
| G06K 9/46 | (2006.01) |
| H04N 5/235 | (2006.01) |
| H04N 5/372 | (2011.01) |
| H04N 19/64 | (2014.01) |
| G06T 5/10 | (2006.01) |
| G06F 17/14 | (2006.01) |
| G06K 9/52 | (2006.01) |
| G06K 9/36 | (2006.01) |

(52) U.S. Cl.
CPC ............ *G06K 9/4609* (2013.01); *G06F 17/142* (2013.01); *G06K 9/522* (2013.01); *G06T 5/10* (2013.01); *H04N 5/2351* (2013.01); *H04N 5/372* (2013.01); *H04N 19/647* (2014.11); *G06K 2009/366* (2013.01); *G06T 2207/20056* (2013.01); *G06T 2207/20064* (2013.01)

(58) Field of Classification Search
CPC .................................................. H04N 5/2171
USPC .................................................. 348/246, 247
See application file for complete search history.

(56) References Cited

U.S. PATENT DOCUMENTS

| | | | |
|---|---|---|---|
| 2003/0133027 A1* | 7/2003 | Itoh .............................. | 348/246 |
| 2007/0030378 A1* | 2/2007 | Aoyama ..................... | 348/340 |
| 2008/0317356 A1* | 12/2008 | Itoh .................... | G06K 9/00771 382/209 |
| 2011/0176034 A1* | 7/2011 | Uchiyama ................. | 348/240.2 |
| 2012/0026326 A1 | 2/2012 | Itoh et al. | |

FOREIGN PATENT DOCUMENTS

WO    WO-2007109856 A1    3/2007

OTHER PUBLICATIONS

"United Kingdom Application Serial No. 1508565.7, Office Action mailed Nov. 16, 2015", 7 pgs.

* cited by examiner

*Primary Examiner* — Joel Fosselman
(74) *Attorney, Agent, or Firm* — Schwegman Lundberg & Woessner, P.A.

(57) ABSTRACT

Generally discussed herein are techniques, software, apparatuses, and systems configured for detecting an anomaly in a camera. In one or more embodiments a method can include: (1) determining a first property of a reference image, (2) determining a second property of a second image captured after the first image, wherein the second property is the same property as the first property, (3) comparing the first property to the second property, (4) determining a lens condition, a protective cover condition, an image sensor condition, a focus, or a field of view of the camera has changed since the first time in response to determining the first property is substantially different from the second property, or (5) sending an alert indicating that the lens condition, the protective cover condition, the image sensor condition, the focus, or the field of view of the camera has changed.

17 Claims, 3 Drawing Sheets

DETECTING CAMERA CONDITIONS TO INITIATE CAMERA MAINTENANCE

BACKGROUND

Cameras have been used by people for many hundreds of years. Some early cameras were used to project an inverted image onto a screen so that the image could be manually traced. Photographic camera technology was not developed until the 1800s. These cameras used chemically coated paper or film. Film technology is still used today. However, digital cameras (cameras that do not use film, but instead use an image sensor that captures light and converts the light into an electronic signal based on a wavelength or intensity of the light) have become more popular than film type cameras. Cameras today are quite ubiquitous in that nearly every modern phone includes a camera and security systems rely on camera technology. Camera technology is now used in a wide array of applications including traffic control systems and advertising, where the cameras can help achieve better traffic conditions or help determine if the advertiser's message is reaching the public.

SUMMARY

An apparatus, in accord with one or more embodiments, can include a processor configured to (1) determine a first property of one or more reference images captured by a camera at a first time, wherein the first property includes at least one of a cross covariance, cross correlation, a frequency spectrum, edge presence, edge orientation, edge shape, or a combination thereof, (2) determine a second property of a second image captured by the camera at a second time after the first time, wherein the second property is the same property as the first property, (3) compare the first property to the second property; (4) determine a lens condition, a protective cover condition, an image sensor condition, focus, or a field of view of the camera has changed since the first time in response to determining the first property is substantially different from the second property; or (5) initiating camera maintenance in response to determining the lens condition, the protective cover condition, the image sensor condition, the focus, or the field of view of the camera has changed.

A method, in accord with one or more embodiments, can include (1) determining a first property of a reference image captured by a camera at a first time, wherein the property includes at least one of a cross covariance, a frequency spectrum, edge presence, edge orientation, edge shape, or a combination thereof, (2) determining a second property of a second image captured by the camera at a second time after the first time, wherein the second property is the same property as the first property, (3) comparing the first property to the second property, or (4) determining a lens condition, a protective cover condition, an image sensor condition, focus, or a field of view of the camera has changed since the first time in response to determining the first property is substantially different from the second property.

A non-transitory computer readable storage device, in accord with one or more embodiments can include instructions stored thereon, the instructions, which when executed by a machine, cause the machine to perform operations comprising (1) determining a first property of a reference image captured by a camera at a first time, wherein the property includes at least one of a cross covariance, cross correlation, a frequency spectrum, edge presence, edge orientation, or edge shape, or a combination thereof, (2) determining a second property of a second image captured at a second time after the first time, wherein the second property is the same property as the first property, (3) comparing the first property to the second property, or (4) determining a lens condition, a protective cover condition, an image sensor condition, focus, or a field of view of the camera has changed since the first time in response to determining the first property is substantially different from the second property.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

DETAILED DESCRIPTION

Figure 1:
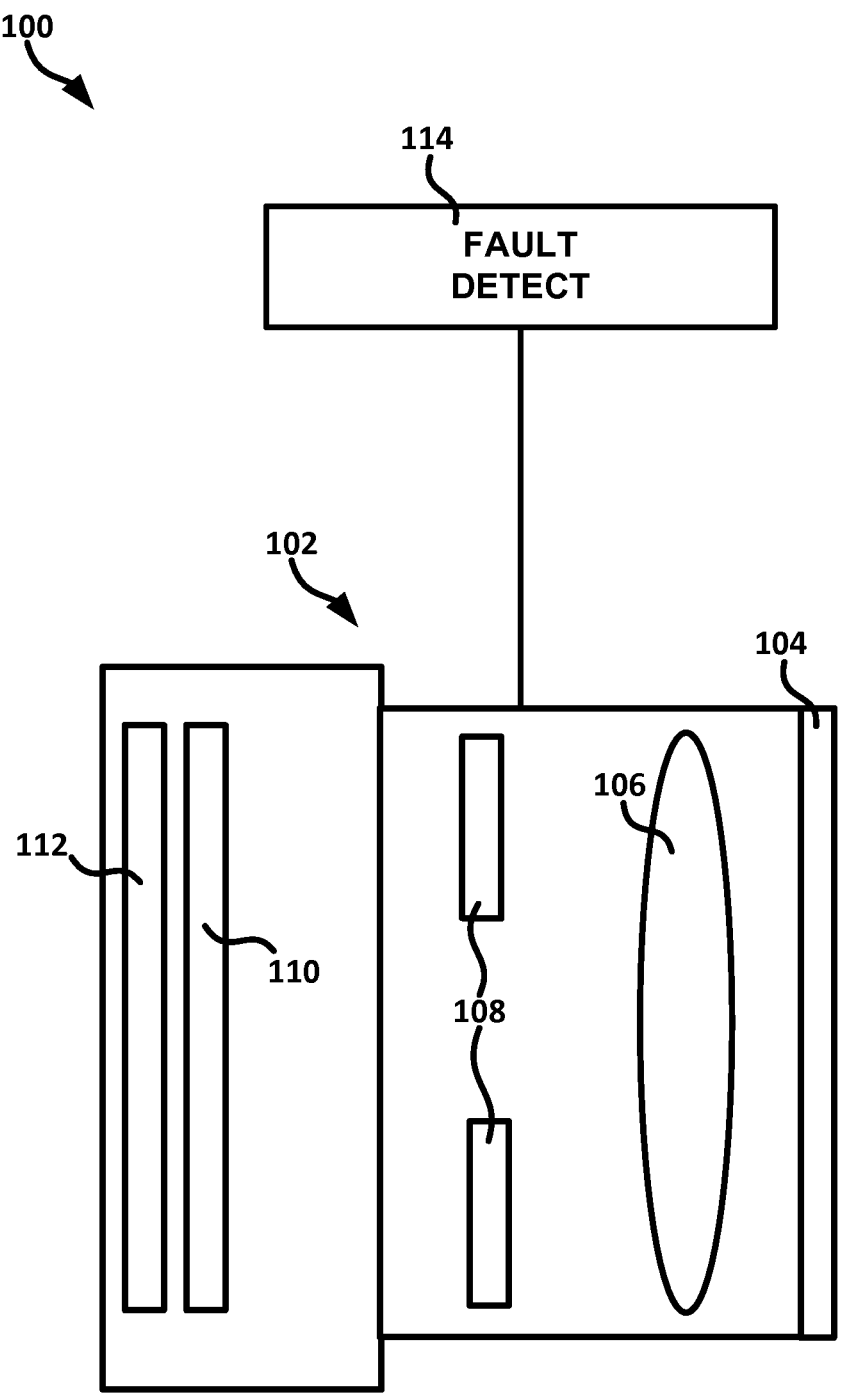
FIG. 1 illustrates a block diagram of an example of a system, according to one or more embodiments.

While embodiments of this disclosure can take many different forms, specific embodiments thereof are shown in the drawings and will be described herein in detail with the understanding that the present disclosure is to be considered as an exemplification of the principles of the invention, as well as the best mode of practicing same, and is not intended to limit the disclosure to the specific embodiments illustrated.

An environmental disturbance, such as dust, moisture, vibration, mechanical impact, or other disturbance, can impede a camera's ability to convey useful or accurate information. The environmental disturbance can propagate to a location which can alter or distort light that is incident on an image sensor of a camera. The environmental disturbance can affect a protective cover, a lens, or an image sensor of a camera and alter an image captured by the camera. In some instances, the environmental disturbance can cause the camera to change focus or occlude a part of the image that is taken by the camera. In some instances, the environmental disturbance can cause the camera to change zoom, optical axis, or otherwise change the field of view of the camera. The environmental disturbance can cause automated detection algorithms to not operate properly. The environmental disturbance can corrupt image data captured by the camera.

If such a disturbance occurs, camera maintenance (e.g., cleaning, reorienting, or recalibrating the camera) can help regain the camera's original or intended field of view or focus. The maintenance can include cleaning the protective cover, lens, or image sensor of the camera. The maintenance can include calibrating, focusing, or positioning the camera.

Camera maintenance can be time consuming or expensive. A camera can be located in an awkward or difficult to reach position, such as an upper corner of a room or mounted on a stoplight, for example. Reaching such cameras can be difficult and can require some specialized equipment for access. Also, cleaning a camera can require specialized knowledge of the camera or specialized tools to gain access to a part of the camera to be cleaned.

Timely detection of an environmental disturbance can help reduce the impact of the disturbance on collected data or an operation of a program that operates based on the collected data. Collected data can be data collected at a previous time or data that is being streamed or currently collected, such as in real-time. An alert can be transmitted to personnel responsible for maintenance of the camera or other personnel that have an interest in the camera, such as an operator, if the environmental disturbance is detected. If maintenance is performed too late then the camera may not be functioning correctly, resulting in loss of at least some of the camera's utility value. If maintenance is performed too soon then the maintenance costs can be increased unnecessarily.

Discussed herein are systems, apparatuses, and techniques for detecting (e.g., automatically detecting, such as without human interference) some environmental disturbances. The systems, apparatuses, or techniques can detect a condition that can generally be fixed through maintenance. The systems, apparatuses, or techniques can process a camera's output video signal (continuously or at regular time intervals). The systems, apparatuses, or techniques can perform one or more operations on the camera's output video signal and output a notification signal (e.g., an alert) to an interested personnel (e.g., an operator of a video surveillance system that includes the camera), such as to indicate that an environmental disturbance was detected or that camera maintenance can help the operation of the camera. The alert can indicate a part of the camera that is affected by the disturbance, such as to help guide the maintenance of the camera, reduce the time it takes to perform the maintenance, or reduce costs associated with maintaining the camera.

Camera maintenance is generally performed at fixed time intervals. In contrast, the systems, apparatuses, or techniques discussed herein provide notifications of conditions that can generally be fixed by maintenance at random times, such as at or around the time an environmental disturbance is detected.

Reference will now be made to the FIGS. to describe further details of the systems, apparatuses, and techniques that can detect an environmental disturbance.

FIG. 1 shows a block diagram of an example of a system 100, according to one or more embodiments. The system 100 can include a camera 102 and a fault detection module 114.

The camera 102 can be communicatively coupled (e.g., through a wired or wireless connection) to the fault detection module 114. The camera 102 can produce images of a field of view of the camera in color or in black and white.

The camera 102 can include a protective cover 104, a lens 106, an aperture 108, a shutter 110, or an image sensor 112. The protective cover 104 can include a generally transparent glass, plastic, polymer, or other material. The protective cover 104 can help protect the lens 106, aperture 108, shutter 110, or image sensor 112 from the environment external to the camera 102. The protective cover 104 can be configured to include no focal length. The protective cover 104 can be configured to not alter or interfere with a light wave incident on the protective cover 104. The protective cover 104 can include a glare reducing mechanism, such as a spray or film, thereon.

The lens 106 can include a generally transparent glass, plastic, polymer, or other material. The lens 106 can help focus light incident thereon on the image sensor 112. The lens 106 can be sized or shaped to include a focal length that is positive, such as when the lens 106 is concave, or negative, such as when the lens 106 is convex. The lens 106 can include a plurality of lenses sized and shaped to focus light incident thereon on the image sensor 112.

The aperture 108 includes an opening that light transmitted by the lens can travel through. The aperture 108 can affect how light is transmitted through to the shutter 110 or the image sensor 112. A narrower aperture 108 can reduce an amount of light transmitted there through. A narrower aperture 108 can help focus the image produced by the camera. A wider aperture 108 can increase the amount of light transmitted to the shutter 110 or image sensor 112. A portion of the image created using a wider aperture can be blurry or out of focus.

The shutter 110 provides a mechanism to block light when the shutter 110 is covering the image sensor 112 and allow light to be incident on the image sensor 112 when the shutter is not covering the image sensor 112. The shutter 110 can allow light to pass for a determined amount of time or can allow pulses of light to pass there through.

The image sensor 112 can include a digital photography image sensor, such as a Charge-Coupled Device (CCD) or an active-pixel sensor. The image sensor 112 can convert light into an electronic signal. Different wavelengths of light incident on the image sensor can cause the image sensor to produce different electronic signals.

The fault detection module 114 can detect an environmental disturbance on or near a part of the camera 102 (e.g., the protective cover 104, the lens 106, the aperture 108, the shutter 110, or the image sensor 112). The fault detection module 114 can calculate a property of a camera image and determine if the camera includes an environmental disturbance at a regular interval (e.g., hourly, daily, weekly, bi-weekly, etc.). The environmental disturbance can include dust, moisture, stain, or damage on a part of the camera 102. The environmental disturbance can occlude a portion of a field of view of the camera 102. The environmental disturbance can alter a path of light incident on the protective cover 104. For example, moisture or a stain on the protective cover 104 can cause light to refract. In an example, natural ware of a camera part (e.g., lens or protective cover) can cause light to refract, such as by the part changing color over time. In another example, dust or some other opaque obstruction on the protective cover 104 can prevent some light from passing through the protective cover 104, thus causing a pixel value to correspond to the environmental disturbance. The environmental disturbance can include a vibration, mechanical impact, or other disturbance that can alter the position of the camera. The environmental disturbance can cause a focus or field of view of the camera to change.

An opaque or mostly opaque environmental disturbance on a part of the camera 102 can be detected by the fault detection module 114, such as by determining a cross covariance at a pixel position in the reference image or an edge detection on a reference image and comparing a result obtained from the cross covariance at the pixel position or the edge detection to a threshold cross covariance or edge detection performed on another image(s) captured by the camera 102. The edge detection can include determining an edge orientation or an edge shape of an edge in the image. If the cross covariance or the edge detection includes substantially different results (e.g., results differing by a specified threshold or percentage), the fault detection module 114 can indicate that an environmental disturbance has been detected. The fault detection module 114 can indicate that the protective cover 104 should be inspected, cleaned, or replaced.

A cross covariance can be determined at a pixel position over a series of reference images, such that for the respective pixel position a cross covariance can be computed over the image series. Another cross covariance over another series of images can be determined in the same manner. The cross covariance over the reference images can be compared to the other cross covariance or a difference between the two cross covariances can be compared to a threshold. Differences that are greater than the threshold can indicate that a particular pixel includes an obstruction.

The fault detection module 114, can detect when the field of view of the camera 102 has changed, such as by determining a cross covariance of the reference image and an image captured at a later time. This cross covariance metric can help determine a similarity between images. A cross covariance can be averaged over multiple images, such as images captured in a specified period of time (e.g., minute(s), hour(s), day(s), etc.) or a specified number of images. That is, a cross covariance of a first image can be averaged with a cross covariance of one or more other images, and the average cross covariance can be used for the comparison.

The fault detection module 114, can detect when the field of view of the camera 102 has changed, such as by calculating a phase correlation between the reference image and the current image.

A cross covariance of one or more pixel values of a series of reference images can be compared to a cross covariance of one or more of the same pixel values of a series of images captured at another time interval, such as a time interval after the series of reference images. For example, consider a stationary camera that includes pixel values corresponding to a first location [x1, y1] and a second location [x2, y2]. The cross covariance of the first and second locations can be calculated on one or more images (e.g., consecutive images) from the camera and compared to a cross covariance of the first and second locations on one or more other images captured by the camera.

Detecting an environmental disturbance is described with reference to cross covariance. However, it will be understood that a cross correlation can be used to detect the same disturbance. These two statistics are similar with the correlation normalized by the product of the standard deviations of the variables involved in the cross correlation.

An environmental disturbance on a part of the camera 102 that causes light to refract can be detected by the fault detection module 114, such as by performing an analysis of the frequency spectrum of the reference image and comparing the frequency spectrum to a frequency spectrum of another image. The fault detection module 114 can perform a Fourier transform or a wavelet transform (e.g., a discrete Fourier transform or a discrete wavelet transform) on both images and compare the results. A wavelet transform is similar to a Fourier transform with the wavelet transform preserving location information of a detected frequency. If the results of the comparison indicate that the frequency content of the images is substantially different (e.g., the image captured after the reference image includes one or more frequencies with a threshold magnitude that are not present in the reference image or a frequency in the reference image is present in the image captured after the reference image but with a magnitude that is bigger or smaller by a threshold amount, or vice versa) the fault detection module 114 can indicate that an environmental disturbance has been detected, such as by transmitting an alert.

A frequency spectrum comparison between the reference image and the image captured later can also detect when the focus of the camera 102 has changed. Such a change in the camera 102 can be detected in response to determining a frequency in the reference image is present in the image captured after the reference image but with a magnitude that is bigger or smaller by a threshold amount.

In one or more embodiments, the fault detection module 114 can detect an occlusion caused by an environmental disturbance in the path of light to the image sensor 112, such as by comparing a pixel color value or pixel intensity value of the reference image to a corresponding pixel color value or pixel intensity value of another image captured by the camera 102. If the pixel color value or the pixel intensity values differ substantially (e.g., by a specified threshold value or percentage), fault detection module 114 can transmit an alert indicating that an environmental disturbance has been detected.

The reference image and the subsequent image can be captured in similar environmental conditions, such as lighting, object, or object orientation in the field of view of the camera 102. By keeping the environmental conditions similar, environmental disturbances detected from the presence of an object, a changed location or orientation of an object, or different lighting conditions can be reduced. The reference image can be an image (or images) captured at a time when the parts of the camera 102 were known to be operating as expected or when no significant environmental disturbances were present (e.g., environmental disturbances that would cause the fault detection module 114 to transmit an alert). The other image can be captured at a time after the reference image.

Figure 2:
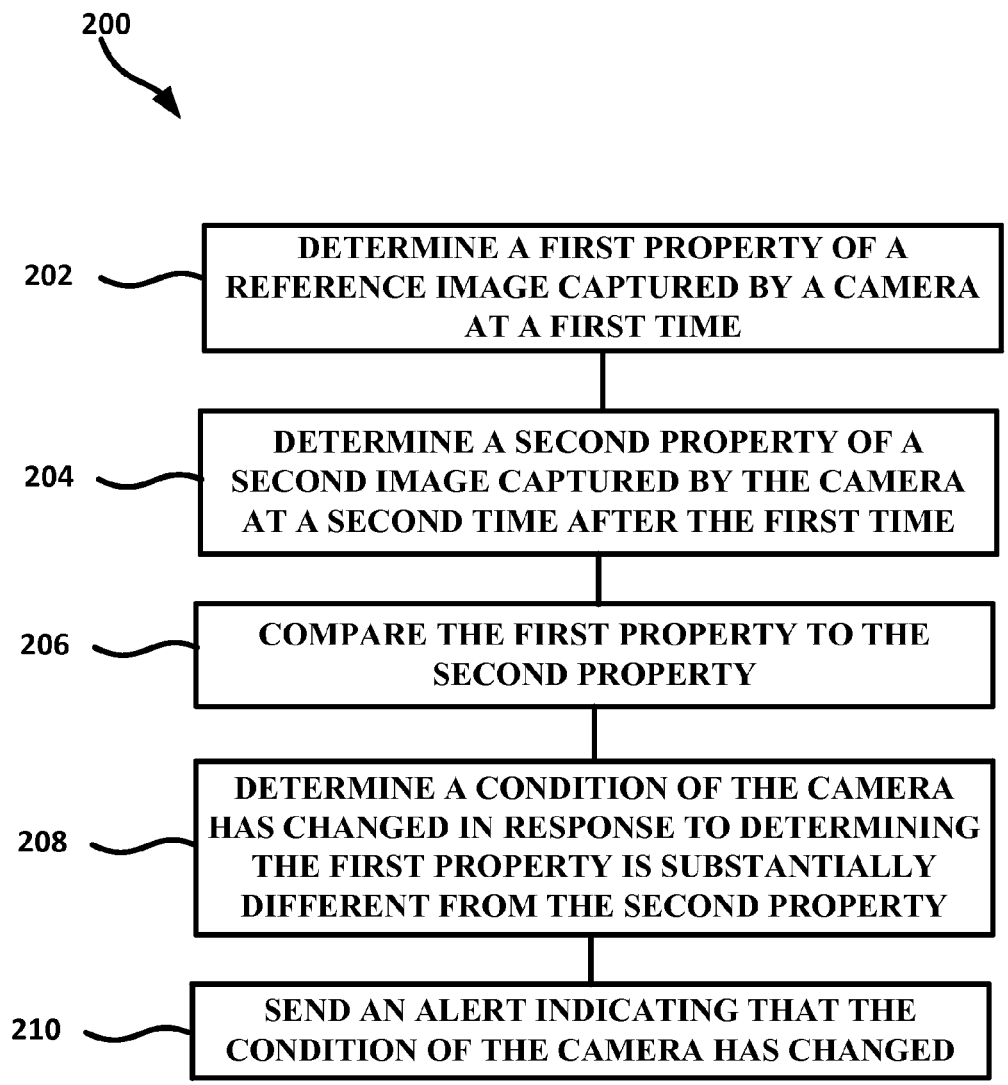
FIG. 2 illustrates a flow diagram of an example of a technique, according to one or more embodiments.

FIG. 2 is a flow diagram of an example of a technique 200, according to one or more embodiments. The technique 200 as illustrated includes: determining a first property of a reference image captured by a camera at a first time at operation 202; determining a second property of a second image captured by the camera at a second time after the first time at operation 204; comparing the first property to the second property at operation 206; determining a condition of the camera has changed in response to determining the first property is substantially different from the second property at operation 208; and sending an alert indicating that the condition of the camera has changed at operation 210.

The first or second property can include at least one of a cross covariance, a cross correlation, a frequency spectrum, edge presence, edge orientation, or edge shape, or a combination thereof. The first property can be the same as the second property, with the first property being a property of a reference image (or a series of reference images) captured at a first time and the second property being a property of an image (or series of images) captured at a time after the reference image. The condition of the camera can include a lens condition, a protective cover condition, an image sensor condition, a focus, or a field of view of the camera. The operation at 208 can include determining that the camera condition has changed since the first time in response to determining the first property is substantially different from the second property. The environmental conditions in which the reference image was captured can be substantially similar to the environmental conditions in which the image captured after the reference image was captured. The environmental conditions can include lighting conditions around or objects in the field of view of the camera.

The operation at 202 can include determining a frequency spectrum of the reference image, and the operation at 208 can include determining the condition of the lens has changed in response to determining the frequency spectrum of the reference image is substantially different from a frequency spectrum of the second image. The operation at 202 or 204 can include performing a Fourier transform or a discrete wavelet transform as a function of the reference image.

The operation at 202 can include determining a cross covariance of the reference image and the operation at 208 can include determining the condition of the image sensor has changed or the camera's field of view has changed in response to determining the cross covariance of the reference image is substantially different from a cross covariance of the second image.

The operation at 202 can include determining a cross covariance of the reference image and performing an edge detection to create an edge map of the reference image. The operation at 208 can include determining the condition of the protective cover has changed in response to determining the cross covariance and the edge map of the reference image is substantially different from a cross covariance and an edge map of the second image. The edge map of the reference image and the edge map of the second image can include an edge presence, edge orientation, or an edge shape of respective edges of the edge map and wherein comparing the first property to the second property includes comparing the respective edge presence, edge orientation, or the edge shape of the respective edge maps.

The technique 200 can include initiating camera maintenance in response to determining a condition of the camera has changed. Initiating camera maintenance can include the operation at 210. Initiating camera maintenance can include logging that the camera condition has changed in a database. Initiating camera maintenance can include transmitting a communication to maintenance personnel. Initiating camera maintenance can include indicating which part of the camera needs maintenance or the condition of the camera that triggered the camera maintenance initiation.

Figure 3:
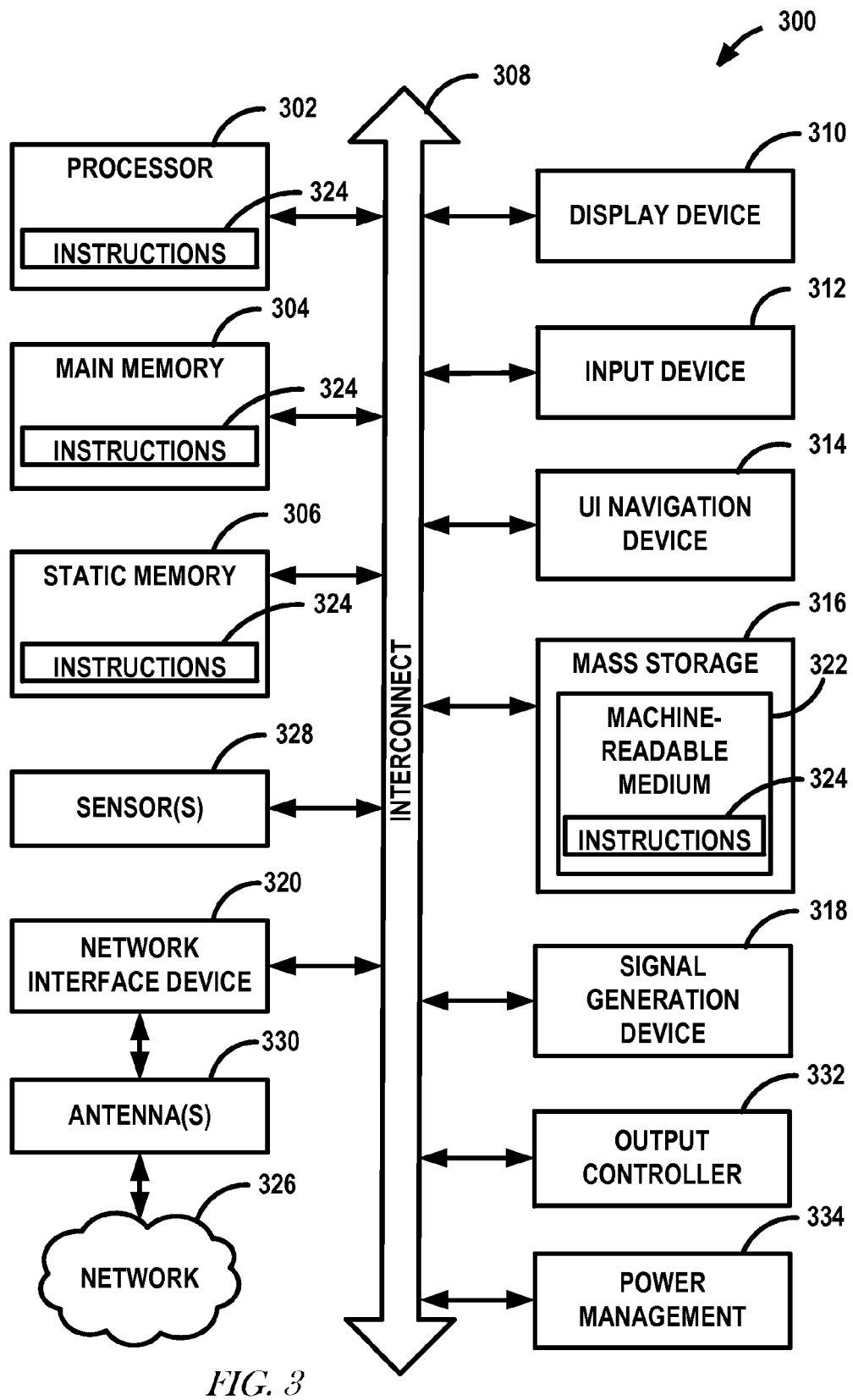
FIG. 3 illustrates a block diagram of an example of a computer system, according to one or more embodiments.

FIG. 3 is a block diagram illustrating an example computer system machine upon which any one or more of the techniques herein discussed can be run, such as a computer system 300 that can be communicatively coupled to the camera 102, or the fault detection module 114. In one or more embodiments, the camera 102 or the fault detection module 114 can include one or more items of computer system 300. Computer system 300 can be embodied as a computing device, providing operations of the camera 102 (from FIG. 1) or fault detection module 114 or any other processing or computing platform or component described or referred to herein. In alternative embodiments, the machine operates as a standalone device or can be connected (e.g., networked) to other machines. In a networked deployment, the machine can operate in the capacity of either a server or a client machine in server-client network environments, or it can act as a peer machine in peer-to-peer (or distributed) network environments. The computer system machine can be a personal computer (PC), such as a PC that can be portable (e.g., a notebook or a netbook) or a PC that is not conveniently portable (e.g., a desktop PC), a tablet, a set-top box (STB), a gaming console, a Personal Digital Assistant (PDA), a mobile telephone or Smartphone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Implementing techniques using computer processors and other logic can lead to automated camera condition change detection (e.g., that does not include human interference).

Example computer system 300 can include a processor 302 (e.g., a central processing unit (CPU), a graphics processing unit (GPU) or both), a main memory 304 and a static memory 306, which communicate with each other via an interconnect 308 (e.g., a link, a bus, etc.). The computer system 300 can further include a video display unit 310, an alphanumeric input device 312 (e.g., a keyboard), and a user interface (UI) navigation device 314 (e.g., a mouse). In one embodiment, the video display unit 310, input device 312 and UI navigation device 314 are a touch screen display. The computer system 300 can additionally include a storage device 316 (e.g., a drive unit), a signal generation device 318 (e.g., a speaker), an output controller 332, a power management controller 334, or a network interface device 320 (which can include or operably communicate with one or more antennas 330, transceivers, or other wireless communications hardware), or one or more sensors 328, such as a GPS sensor, compass, location sensor, accelerometer, or other sensor.

The storage device 316 includes a machine-readable medium 322 on which is stored one or more sets of data structures and instructions 324 (e.g., software) embodying or utilized by any one or more of the methodologies or functions described herein. The instructions 324 can also reside, completely or at least partially, within the main memory 304, static memory 306, and/or within the processor 302 during execution thereof by the computer system 300, with the main memory 304, static memory 306, or the processor 302 also constituting machine-readable media. The processor 302 configured to perform an operation can include configuring instructions of a memory or other machine-readable media coupled to the processor, which when executed by the processor, cause the processor 302 to perform the operation.

While the machine-readable medium 322 is illustrated in an example embodiment to be a single medium, the term "machine-readable medium" can include a single medium or multiple media (e.g., a centralized or distributed database, and/or associated caches and servers) that store the one or more instructions 324. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, optical media, and magnetic media. Specific examples of machine-readable media include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 324 can further be transmitted or received over a communications network 326 using a transmission medium via the network interface device 320 utilizing any one of a number of well-known transfer protocols (e.g., HTTP). Examples of communication networks include a local area network (LAN), wide area network (WAN), the Internet, mobile telephone networks, Plain Old Telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in this document, the terms "first," "second," and "third," etc. are used merely as labels, and are not intended to impose numerical requirements on their objects.

As used herein, a "-" (dash) used when referring to a reference number means or, in the non-exclusive sense discussed in the previous paragraph, of all elements within the range indicated by the dash. For example, 103A-B means a nonexclusive or of the elements in the range {103A, 103B}, such that 103A-103B includes "103A but not 103B", "103B but not 103A", and "103A and 103B".

From the foregoing, it will be observed that numerous variations and modifications can be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

Although a few embodiments have been described in detail above, other modifications are possible. For example, the logic flows depicted in the FIGS. do not require the particular order shown, or sequential order, to achieve desirable results. Other steps can be provided, or steps can be eliminated, from the described flows, and other components can be added to, or removed from, the described systems. Other embodiments can be within the scope of the following claims.

The invention claimed is:

1. An apparatus comprising a processor configured to:
    determine a first property of a reference image captured by a camera at a first time, wherein the first property includes a cross covariance;
    determine a second property of a second image captured by the camera at a second time after the first time, wherein the second property is the same property as the first property;
    compare the first property to the second property;
    determine an image sensor condition or a field of view of the camera has changed since the first time in response to determining the first property is substantially different from the second property, including determining a difference between the first property and the second property is greater than a threshold cross covariance; and
    initiating camera maintenance in response to determining the image sensor condition or the field of view of the camera has changed.

2. The apparatus of claim 1, wherein the reference image was captured in a first set of environmental conditions including lighting conditions and objects in the field of view of the camera and the second image was captured in a second set of environmental conditions substantially similar to the first environmental conditions.

3. The apparatus of claim 2, wherein the processor is further configured to determine a frequency spectrum of the reference image and the second image, and wherein the processor is further configured to determine a lens condition has changed in response to determining the frequency spectrum of the reference image is substantially different from the frequency spectrum of the second image.

4. The apparatus of claim 3, wherein the processor configured to determine the frequency spectrum of the reference image includes the processor is configured to perform a Fourier transform or a discrete wavelet transform as a function of the reference image.

5. The apparatus of claim 2, wherein the processor configured to determine the first property includes the processor is configured to determine a cross covariance of a respective pixel in a series of reference images including the reference image and the respective pixel in a series of images captured after the series of reference images, and performing an edge detection to create an edge map of the series of reference images and the series of images captured after the series of reference images, and wherein the processor configured to determine the condition has changed includes the processor is configured to determine the condition of the protective cover has changed in response to determining the cross covariance and the edge map of the series of reference images is substantially different from a cross covariance and an edge map of the series of images captured after the series of reference images.

6. The apparatus of claim 5, wherein the edge map of the reference image and the edge map of the second image include an edge orientation and an edge shape of respective edges of the edge map and wherein the processor configured to compare the first property to the second property includes the processor is configured to compare the edge orientation and the edge shape of the respective edge maps.

7. A method comprising:
    determining a first property of a reference image captured by a camera at a first time, wherein the first property includes a cross covariance;
    determining a second property of a second image captured by the camera at a second time after the first time, wherein the second property is the same property as the first property;
    comparing the first property to the second property;
    determining an image sensor condition or a field of view of the camera has changed since the first time in response to determining the first property is substantially different from the second property, including determining a difference between the first property and the second property is greater than a threshold cross covariance; and
    initiating camera maintenance in response to determining the image sensor condition or the field of view of the camera has changed.

8. The method of claim 7, wherein the reference image was captured in a first set of environmental conditions including lighting conditions and objects in the field of view of the camera and the second image was captured in a second set of environmental conditions substantially similar to the first environmental conditions.

9. The method of claim 8, wherein the method further includes determining a frequency spectrum of the reference image and the second image, and determining a condition of a lens has changed in response to determining the frequency spectrum of the reference image is substantially different from a frequency spectrum of the second image.

10. The method of claim 9, wherein determining the frequency spectrum of the reference image includes performing a Fourier transform or a discrete wavelet transform as a function of the reference image.

11. The method of claim 8, wherein determining the first property includes determining a cross covariance of a respective pixel in a series of reference images including the reference image and the respective pixel in a series of images captured after the series of reference images, and performing an edge detection to create an edge map of the series of reference images and the series of images captured after the series of reference images, and wherein determining the condition has changed includes the determining the condition of the protective cover has changed in response to determining the cross covariance and the edge map of the series of reference images is substantially different from a cross covariance and an edge map of the series of images captured after the series of reference images.

12. The method of claim 11, wherein the edge map of the reference image and the edge map of the second image include an edge orientation and an edge shape of respective edges of the edge map and wherein comparing the first property to the second property includes comparing the edge orientation and the edge shape of the respective edge maps.

13. A non-transitory computer readable storage device comprising instructions stored thereon, the instructions, which when executed by a machine, cause the machine to perform operations comprising:
   determining a first property of a reference image captured by a camera at a first time, wherein the first property includes a cross covariance;
   determining a second property of a second image captured at a second time after the first time, wherein the second property is the same property as the first property;
   comparing the first property to the second property;
   determining an image sensor condition has changed since the first time in response to determining the first property is substantially different from the second property, including determining a difference between the first property and the second property is greater than a threshold cross covariance; and
   initiating camera maintenance in response to determining the image sensor condition or the field of view of the camera has changed.

14. The storage device of claim 13, wherein the reference image was captured in a first set of environmental conditions including lighting conditions and objects in the field of view of the camera and the second image was captured in a second set of environmental conditions substantially similar to the first environmental conditions.

15. The storage device of claim 14, wherein the instructions further include instructions, which when executed by the machine, cause the machine to perform operations comprising determining a frequency spectrum of the reference image and the second image, and determining a condition of a lens has changed in response to determining the frequency spectrum of the reference image is substantially different from the frequency spectrum of the second image.

16. The storage device of claim 15, wherein the instructions for determining the frequency spectrum of the reference image include instructions, which when executed by the machine, cause the machine to perform operations comprising performing a Fourier transform or a discrete wavelet transform as a function of the reference image.

17. The storage device of claim 14, wherein:
   the instructions for determining the first property include instructions for determining a cross covariance of a respective pixel in a series of reference images including the reference image and the respective pixel in a series of images captured after the series of reference images, and performing an edge detection to create an edge map of the series of reference images and the series of images captured after the series of reference images, and
   the instructions for determining the condition has changed include instructions for determining the condition of the protective cover has changed in response to determining the cross covariance and the edge map of the series of reference images is substantially different from a cross covariance and an edge map of the series of images captured after the series of reference images,
   the instructions for comparing the first property to the second property include instructions, which when executed by the machine, cause the machine to perform operations comprising comparing the edge orientation and the edge shape of the respective edge maps, and
   the instructions for determining the condition has changed include instructions which when executed by the machine, cause the machine to perform operations comprising determining the condition of the protective cover has changed in response to determining the cross covariance and the edge map of the reference image is substantially different from a cross covariance and an edge map of the second image.

\* \* \* \* \*